(12) United States Patent
Katsman et al.

(10) Patent No.: US 6,633,605 B1
(45) Date of Patent: Oct. 14, 2003

(54) PULSE CODE SEQUENCE ANALYZER

(75) Inventors: Vladimir Katsman, Rancho Palos Verdes, CA (US); Richard N. Nottenburg, Princeton, NJ (US)

(73) Assignee: Multilink Technology Corp., Somerset, NJ (US)

( * ) Notice: Subject to any disclaimer, the term of this patent is extended or adjusted under 35 U.S.C. 154(b) by 0 days.

(21) Appl. No.: 09/593,264

(22) Filed: Jun. 13, 2000

Related U.S. Application Data (63) Continuation of application No. 09/191,783, filed on Nov. 13, 1998, now Pat. No. 6,115,416.

(51) Int. Cl.[7] .......................... H04B 17/00; H04B 3/46; H04Q 1/20
(52) U.S. Cl. ..................... 375/226; 375/371; 714/706; 327/166
(58) Field of Search ................................ 375/224, 225, 375/226, 371; 714/704, 706; 327/165, 161, 72, 73, 166

(56) References Cited

U.S. PATENT DOCUMENTS 4,823,360 A * 4/1989 Tremblay et al. ........... 375/214
5,014,276 A * 5/1991 Bush et al. .................. 714/704
6,115,416 A * 9/2000 Katsman et al. ............ 375/224

* cited by examiner

Primary Examiner—Phuong Phu
(74) Attorney, Agent, or Firm—Douglas A. Chaikin; Peninsula IP Group (57) ABSTRACT

A pulse code analyzer for analyzing data transmitted by transmitter/receivers on a transmission facility interconnecting the transmitter/receivers. The analyzer apparatus has a data converter with a reference and an auxiliary channel for receiving the data and clock apparatus for recovering a clock signal from the data and generating variable time delayed subtone clock signals to the data converter reference and auxiliary channels. Processor apparatus coupled to the data converter and clock means controls a time delay between the subtone clock signals and the voltage level of data received by the channels to detect errors occurring in the received data and records the detected errors in counter apparatus coupled to the data converter channels and clock apparatus. The processor apparatus records a three dimensional matrix of the recorded errors determining a probability predicting the data errors.

4 Claims, 10 Drawing Sheets

PULSE CODE SEQUENCE ANALYZER

CROSS REFERENCE TO OTHER PATENTS

This application is a continuation of Ser. No. 09/191,783 filed Nov. 13, 1998 now issued as U.S. Pat. No. 6,115,416, Issue Date Sep. 5, 2000 which is currently an active patent.

FIELD OF THE INVENTION

This invention relates generally to pulse code apparatus and in particular to a pulse code sequence analyzer system and method for determining the quality of data transmission in data transmission systems.

BACKGROUND OF THE INVENTION

Transmission systems generally have transmitter/receiver apparatus and a transmission facility interconnecting the transmitter/receiver apparatus and providing a path over which data may be exchanged between the transmitter/receiver apparatus. Increasing advances in technology and the need to exchange information in a short time interval require greater speed in the rate of transmitting data. The technology has gone from analog systems to digital information systems capable of transmitting digital information in the form of "0's" and "1's" oftentimes referred to as bits. In an effort to increase the speed of transmission systems, the technology has advanced to the use of optical transmission systems using optical transmitter/receivers interconnected by optical transmission facilities such as optical fibers or laser systems that transmit optical pulse bit information between the optical transmitter/receivers.

Digital and optical transmission systems oftentimes have transmitter/receiver devices connected by transmission facilities all of which are subject to noise wherein noise may be any spurious or undesired disturbances that tend to disrupt the transmitted data by generating errors that obscure and mask the data information. During the design phase of the system special efforts are undertaken to design the apparatus to minimize noise. However, erratic disturbances normally beyond control of the designer, occur irregularly due to spontaneous fluctuations. These types of disturbances may be electromagnetic inferences, power supply problems, electrical storms, surges in voltages and the like.

Various techniques have been devised to measure errors and noise in communication and transmission systems. In some apparatus, data and a clock signal recovered from the data is applied to an error corrector and to a delay. A comparator compares the corrected data with the delayed data and outputs a pulse when the data are not coincident. The recovered clock signal is counted and when a predetermined number are counted, the apparatus latches the comparator generated pulses to obtain a received data bit error sum approximate number. In some apparatus, a sliding window is used wherein the number of error bits received during a predetermined number of received bits is calculated to determine the bit error rate. In yet other systems, the bit error rate is monitored by integrating line bit-interleaved-parity indications over a length of time and sounding an alarm when the count exceeds a threshold.

Although apparatus has been previously disclosed for determining the bit error rate, the increasing need for faster transmission of information requires the development of apparatus and a method of improving the determination of noise and errors rates occurring in the transmitter/receivers and occurring during transmission of data over transmission facilities interconnecting the transmitter/receivers.

SUMMARY OF THE INVENTION

It is an object of the invention to provide pulse code sequence apparatus and a method for determining errors occurring in transmitters and receivers and in data transmission between the transmitters/receivers.

It is also an object of the invention to provide pulse code sequence apparatus having a data converter for receiving the data and a clock section for recovering a clock signal from the received data and for dividing the recovered clock into a pair of subtone clock signals.

It is also an object of the invention to provide the data converter with a reference and an auxiliary channel and to couple ones of the clock section divided subtone clock signals to the reference and auxiliary channels.

It is also an object of the invention to insert a fixed and variable time delay into one of the subtone clock signals and connect the one time delayed subtone clock signal to the data converter reference channel and to insert a variable time delay into the other subtone clock signal and apply the other subtone clock signal to the data converter auxiliary channel.

It is also an object of the invention to provide a processor for controlling a length of a variable time delay inserted into the subtone clock signals and apply the delayed subtone clock signal to the reference and auxiliary channels to create a time delay between the reference and auxiliary channels in which to detect errors occurring in the pulse code sequence analyzer received data transmissions.

It is also an object of the invention to provide a processor controlled voltage comparator input for the pulse code sequence data converter reference and auxiliary channel to determine the voltage level of data received by the channels.

It is a further object of the invention to provide a counter for counting the errors detected during the processor controlled time delay between the data converter reference and auxiliary channels and for enabling the processor to create a matrix of counted errors in a varying voltage versus varying time format enabling the processor to determine a probability predicting the data errors.

In a preferred embodiment of the invention, a pulse code sequence analyzer for analyzing data has a data converter for receiving the data and clock front end apparatus for recovering a clock signal from the data and applying generated subtone clock signals to the data converter. A ripple counter coupled with the data converter and the clock front end apparatus records errors occurring in the data. A processor coupled to the counter, data converter and clock means controls the clock and data converter means to detect errors occurring in the data received by the data converter means and records an error matrix determining a probability predicting errors occurring in the data.

Also in accordance with the preferred embodiment of the invention, the pulse code sequence analyzer for analyzing data has a data converter with a reference and an auxiliary channel for receiving the data and with each channel having a processor controlled voltage comparator for determining a variable voltage level of data received by the reference and auxiliary channel.

Also in accordance with the preferred embodiment of the invention, the pulse code sequence analyzer for analyzing data has clock front end buffer means for dividing the recovered clock signal into a pair of subtone clock signals, a fixed delay line for inserting a fixed time delay into a first one of the subtone clock signals and a pair of variable delay lines controlled by a processor for inserting a variable time delay into the one subtone clock signal following the fixed time delay and a variable time delay into the other subtone clock and applying the time delayed clock signals to the data converter reference and auxiliary channels.

Also in accordance with the preferred embodiment of the invention, the pulse code sequence analyzer for analyzing data has a processor controlling the variable delay lines to insert variable time delays into subtone clock signals and apply the time delayed subtone clock signals to the data converter reference and auxiliary channels to create a time delay between the reference and auxiliary channels in which to detect errors occurring in the pulse code sequence analyzer received data transmissions.

Also in accordance with the preferred embodiment of the invention, the pulse code sequence analyzer for analyzing data has a counter apparatus connected to the data converter reference and auxiliary channels for counting errors detected during the processor controlled time delay between the data converter reference and auxiliary channels and for enabling the processor to create a matrix of counted errors enabling the processor to determine a probability predecting the transmitted data.

Also in accordance with the preferred embodiment of the invention, a method of analyzing data in a data transmission has the steps of receiving data from transmitter/receivers and a transmission path interconnecting the transmitter/receivers in voltage comparators of a reference and auxiliary channel and recovering a clock signal from the received data. The method further includes the steps of dividing the recovered clock signal by a predefined number N and generating a pair of subtone clock signals. The method continues by inserting a fixed length time delay and a variable time delay in a subtone signal and applying the subtone signal to the reference channel and by inserting another variable time delay in the other subtone clock signal applied to the auxiliary channel wherein the subtone clock signals are separated by a variable time delay. Method steps include varying the voltage level of the channel voltage regulators and the length of the variable time delays in time thereby changing the time length of the channel separating variable time delay. The method continues by detecting and counting errors appearing in the received data during the variable time delay and recording the counted errors in a memory of a processor as a matrix of the counted errors in voltage amplitude versus time thereby enabling the processor to determine a probability predicting the data errors. A step of varying the voltage level of the channel voltage regulators and the length of the variable time delays includes a step of generating analog signals in response to digital signals received from the processor for controlling the voltage level of the channel voltage comparators and the time delay of the variable time delays in real time.

BRIEF DESCRIPTION OF THE DRAWINGS

For a further understanding of the objects and advantages of the present invention, reference should be had to the following detailed description, taken in conjunction with the accompanying drawing figures, in which like parts are given like reference numerals and wherein.

The detailed logic of the pulse code sequence analyzer set forth in FIGS. 2, 3, 4 and 5 of the drawing is performed by logic gates, flip flops, counters, dividers, comparators, digital-to-analog converters and processors, the operation of which are well known in the art and the details of which need not be disclosed for an understanding of the invention. Typical examples of the logic circuitry are described in numerous text books. For example, such types of logic circuitry, among others, are described by J. Millman and H. Taub in *Pulse, digital and switching waveforms*, 1965, McGraw-Hall, Inc., H. Alex Romanowitz and Russell E. Puckett in *Introduction to Electronics*, 1968, John Wiley & Sons, Inc. and in *The TTL Data Book for Design Engineers*, Second Edition, 1976, Texas Instruments Incorporated.

DETAILED DESCRIPTION OF THE INVENTION

Figure 1:
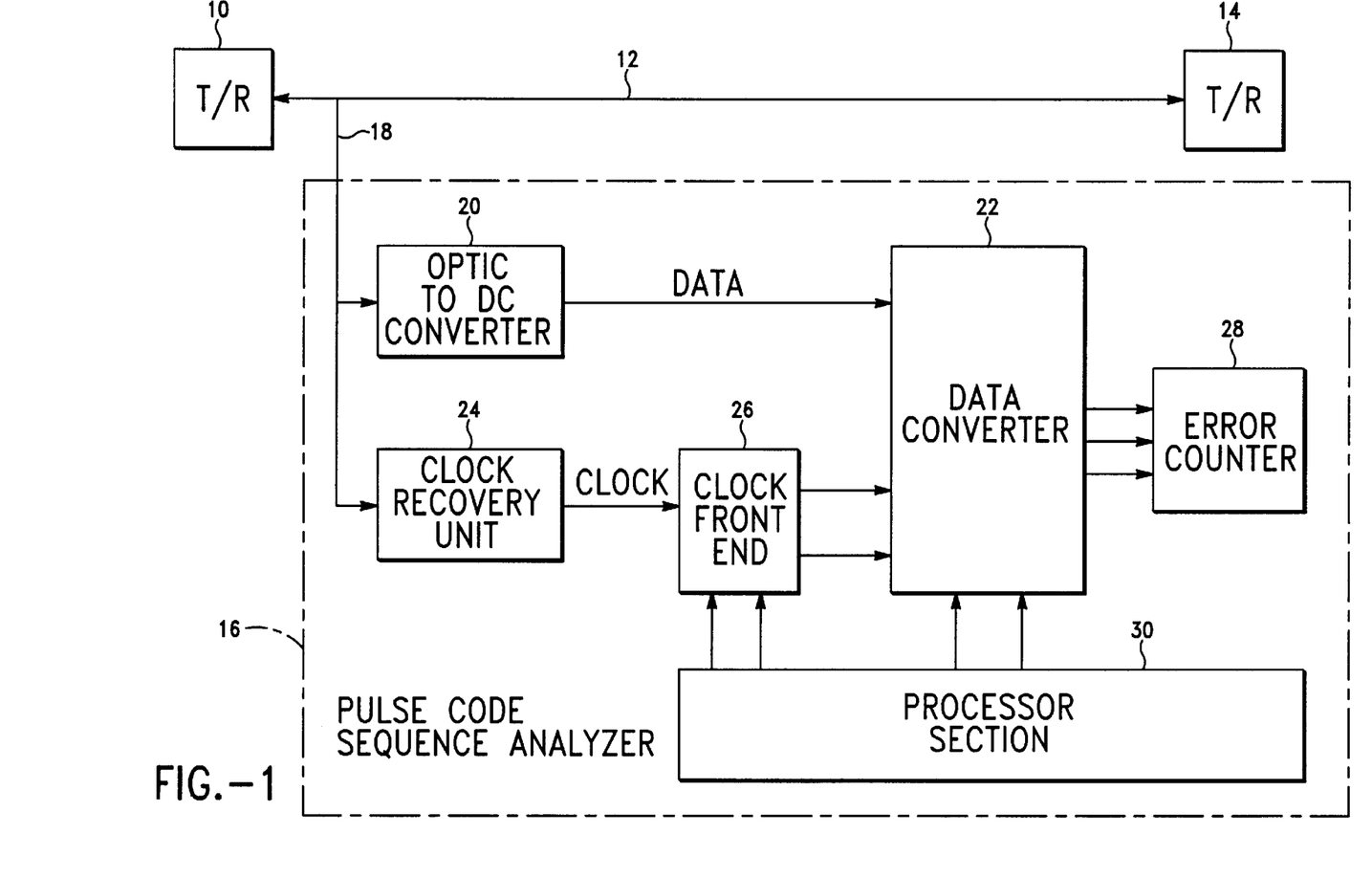
FIG. 1 is a block diagram of a pulse code sequence analyzer system for determining the quality of transmission in a digital transmission system.

With particular reference to FIG. 1, there is shown a pulse code sequence analyzer system 16 for analyzing data in a data transmission system. The transmission system basically comprises transmitter/receiver apparatus 10, 14 interconnected by a transmission facility such as a transmission line 12. Each of the transmitter/receiver apparatus 10, 14 may be of a type well known in the communication field and need not be described for an understanding of the invention. Sufficient for an understanding of the invention, the transmitter/receivers 10, 14 may be, although not limited thereto, optical or digital devices capable of generating and receiving optical and digital pulse signals by way of a transmission medium 12 interconnecting the transmitter/receiver devices 10, 14. In one application, transmitter/receivers 10, 14 may be optical devices capable of generating and receiving optical pulse signals over a transmission line 12 such as an optical fiber or type of transmission medium interconnecting the optical devices. In another application, transmitter/receivers 10, 14 may be digital devices capable of generating and receiving digital pulse signals over a transmission line 12 such as a coaxial cable or transmission line or path interconnecting the digital devices.

A transmission line 18 is used to couple transmission line 12 or the transmitter/apparatus 10, 14 with pulse code sequence analyzer 16. In one embodiment of the invention, optical to electronic DC converter 20, any one of a type well known in the art, converts optical signals appearing on transmission line 12 or generated or received by transmitter/receivers 10, 14 into data signals applied as data to data converter 22. In another embodiment of the invention, digital data signals appearing on the transmission line 12 interconnecting digital transmitter/receiver devices 10, 14 are coupled over line 18 to pulse code sequence analyzer 16 and applied as data to data converter 22. In both embodiments, clock recovery unit 24 recovers a clock signal from the data appearing on transmission lines 12, 18 or which may be generated by transmitter/receivers 10, 14 and applies the recovered clock signal to the pulse code sequence analyzer clock front end circuit 26. Typically, the data and recovered clock signals may be in the range of 25 giga-bits and giga-herz per second respectively, although it is to be understood that pulse code sequence analyzer 16 may be used with transmission systems transmitting data over a wide spectrum of frequencies. Clock front end unit 26 has buffer apparatus that divides the incoming clock signal into component signals in a manner hereinafter described in detail that are applied as a pair of subtone clock signals to the data converter 22. Data converter 22 determines errors occurring in the data and records a count of the errors in error counter 28. Processor section 30 responds to the error count recorded in error counter 28 by controlling the clock front end unit 26 and data converter 22 to determine the error occurring in the data being transmitted between transmitter/receivers 10, 14 over transmission line 12.

Figure 2:
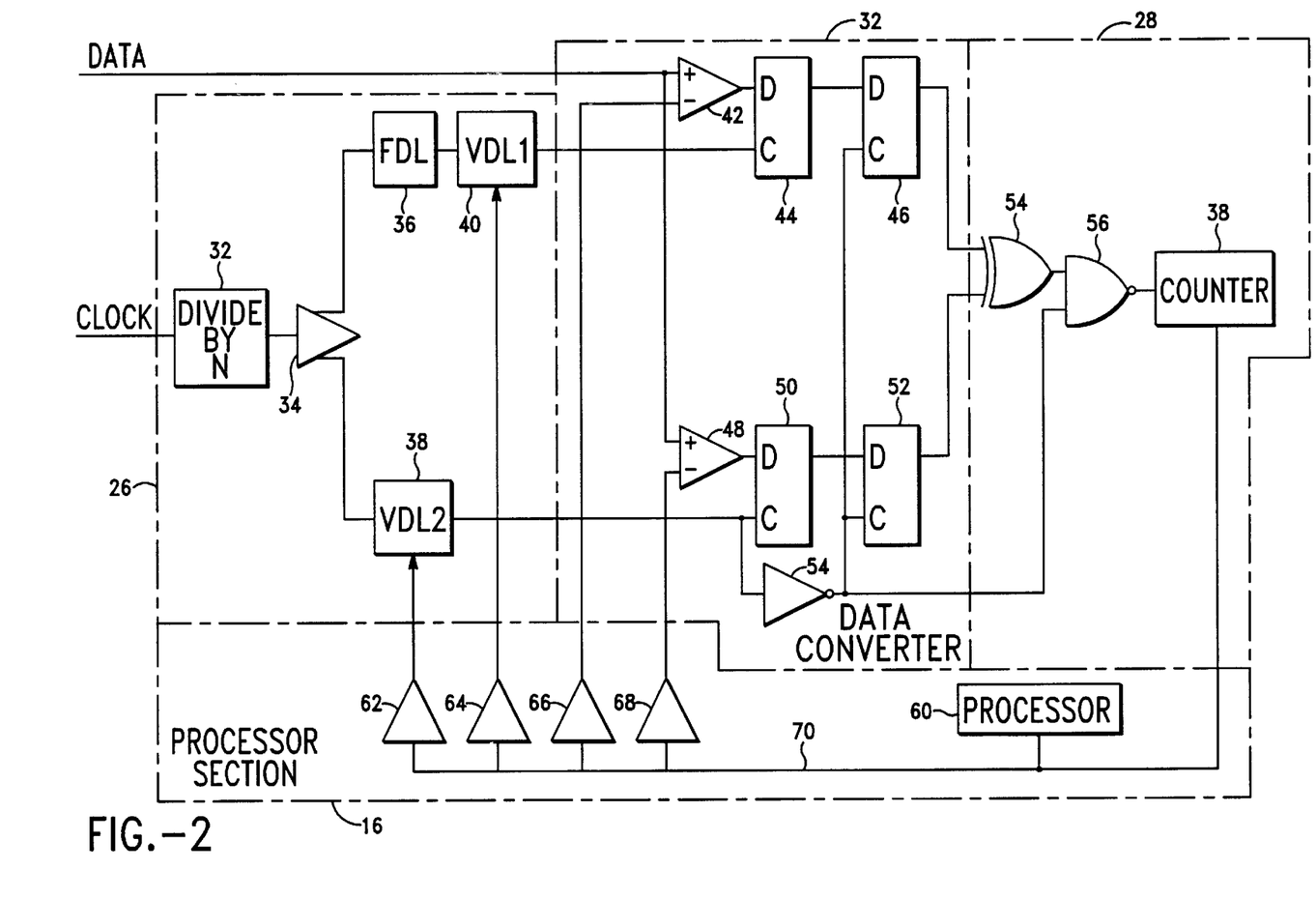
FIG. 2 is a block diagram of the components of the pulse code sequence analyzer set forth in FIG. 1.

Data converter 22, FIG. 2, has a reference channel and an auxiliary channel each receiving data from transmission line 18. Each of the reference and auxiliary channels has a voltage comparator 42, 48, respectively, with one input connected to the optical to electronic converter 20, or in non-optical applications to transmission line 18, to receive data. Another input of each voltage comparator 42, 48 is coupled to a digital-to-analog converter 66, 68, respectively, and is controlled by processor 60 thereby independently determining the voltage level of data received by each reference and auxiliary channel. Connected to the output of each voltage comparator 42 and 48 is a pair of interconnected bistable devices 44, 46 and 50, 52. Each device 44, 46, 50, 52 is a bistable circuit which may be a bistable logic circuit or other type of similar device, hereinafter referred to as a flip/flop circuit, having one input referenced herein as a data or D input and another clock input referenced as a C input. The circuit details of such flip/flop circuits are well known in the art and need not be defined in detail for an understanding of the instant invention. Sufficient to say that each flip/flop can exist indefinitely in one of two states and is caused to change states by means of signals applied to the D or C inputs. In the reference channel, the D input of the first flip/flop circuit 44 is connected to the output of the voltage comparator 42 and the output terminal, corresponding with the D input, is activated by a signal applied to the input D and is connected to the input D of the second flip/flop circuit 46. The output of the auxiliary channel voltage comparator 48 is connected to input D of flip/flop circuit 50 which has the output corresponding with the D input and which is activated by a signal applied to the D input, connected to the input D of the second flip/flop circuit 52.

The clock front end section 26, FIG. 2, has a divider circuit 32 that divides the recovered clock signal by N, wherein N may be a predetermined number such 2, 4 or 8, or the like, into a subtone clock signal that is applied to the input of a dock buffer circuit 34. Clock buffer circuit 34 separates the subtone clock signal into a pair of subtone clock signals each having the same frequency as the subtone clock signal. A first one of the subtone clock signals is applied to the input of a fixed delay line 36 connected to an output of clock buffer circuit 34 such that the fixed delay line 36 inserts a fixed time delay into the first subtone clock signal. An input of variable delay line 40, controlled by the processor 60 via digital-to-analog controller 64 of processor section 16, is connected to the output of the fixed delay line 36 and inserts a variable time delay determined by processor 60 into the first subtone clock signal applied to the C input of the flip/flop circuit 44 of the data converter reference channel.

A second one of the subtone clock signals is applied to the input of a second variable delay line 38, controlled by the processor 60 via digital-to-analog controller 62 of processor section 30, and which is connected to the output of the clock buffer 34. The variable delay line 38 inserts a variable time delay determined by processor 60 into the second subtone clock signal applied to the C input of the flip/flop circuit 50 of the data converter auxiliary channel connected to the variable delay line 38. An inverter 54 of data converter 22 is connected to the output of variable delay line 38 and applies an inverted time delayed second subtone clock signal to the C input of bistable flip/flop circuits 46 and 52 connected to the output of the inverter circuit 54.

Error counter 28, as shown in FIG. 2, has logic devices such as a logic gate 53 having two inputs connected to flip/flop circuits 46, 52 of the reference and auxiliary channels, respectively. The output of the logic gate 53 is connected to one input of NAND gate 56 having another input connected to the output of inverter circuit 54 of the data converter 22 and an output connected to the input of ripple counter 58.

Figure 3:
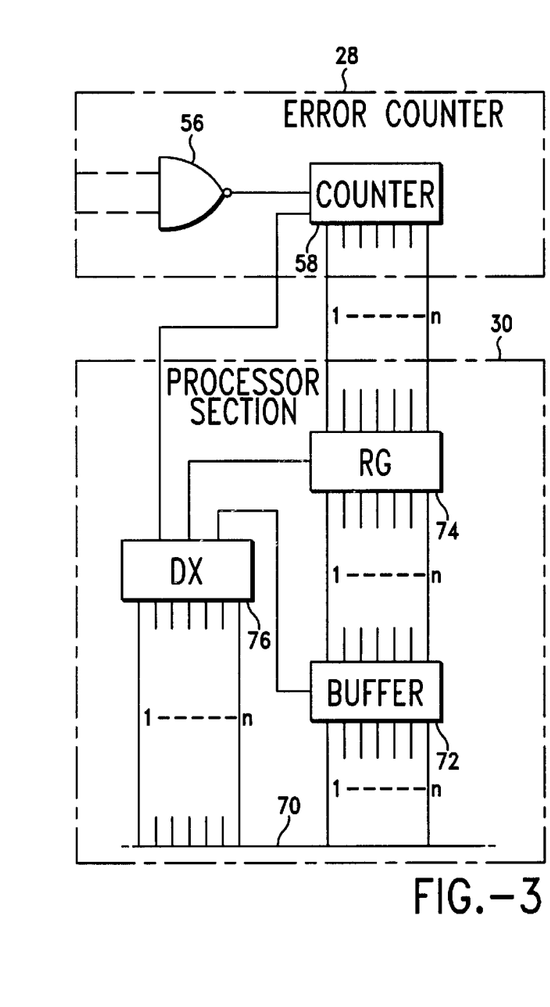
FIG. 3 is a block diagram illustrating the connection of the error counter set forth in FIG. 2 with the processor bus of the processor section, FIG. 4 sets forth details of digital-to-analog converters of FIG. 2 enabling the processor via the processor bus to control operation of the clock front end variable delay lines and the data converter comparators.

Ripple counter 58, FIG. 3, having a serial input and a parallel multi-lead output is connected via a multi-lead transmission path, parallel register circuit 74 and buffer circuit 72 to the processor bus 70. Processor 60, FIG. 2, a programmable digital processor or equivalent, controls ripple counter 58, parallel register circuit 74 and buffer circuit 72 by means of an address decoder 76, FIG. 3, connected by a multi-lead transmission path to processor bus 70. Thus, processor 60 controls address decoder 76 to reset counter 58 when required and to send error data registered in counter 58 to processor 60 over processor bus 70 by enabling parallel register 74 and buffer circuit to read the error data from counter 58 via processor bus 70 into processor 60, FIG. 2.

Figure 4:
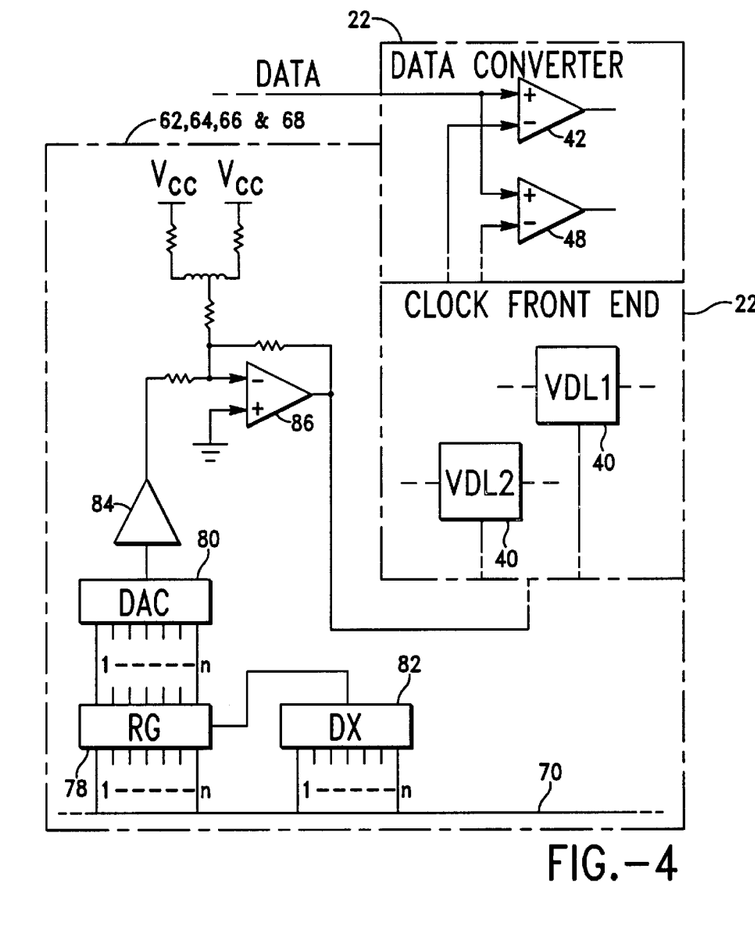

Processor 60 controls the operation of variable delay lines 38, 40 and voltage comparators 42, 48 by the operation of digital-to-analog controllers 62, 64, 66 and 68. Digital-to-analog controllers 62, 64, 66, FIG. 4, are similar and all have a parallel register 78 and address decoder 82, FIG. 4, connected by a multi-lead transmission path to processor bus 70. The number of leads in the transmission paths may vary depending on the type of processor 60 and the number of paths and configuration in the processor bus 70. The parallel register 78 is further connected by the multi-lead transmission path to digital-to-analog converter 80. In operation, processor 60 addresses address decoder 82 which enables parallel register 78 to send digital enabling data appearing on processor bus 70 to digital-to-analog converter 80. Digital-to-analog converter 80 converts the received digital enabling information into an analog signal that is applied via inverter 84 to a voltage converter 86. Depending on the value of the received analog signal, voltage converter 86 applies an enabling signal to the appropriate clock front end variable delay lines 38, 40 and data converter voltage comparators 42, 48.

Figure 5:
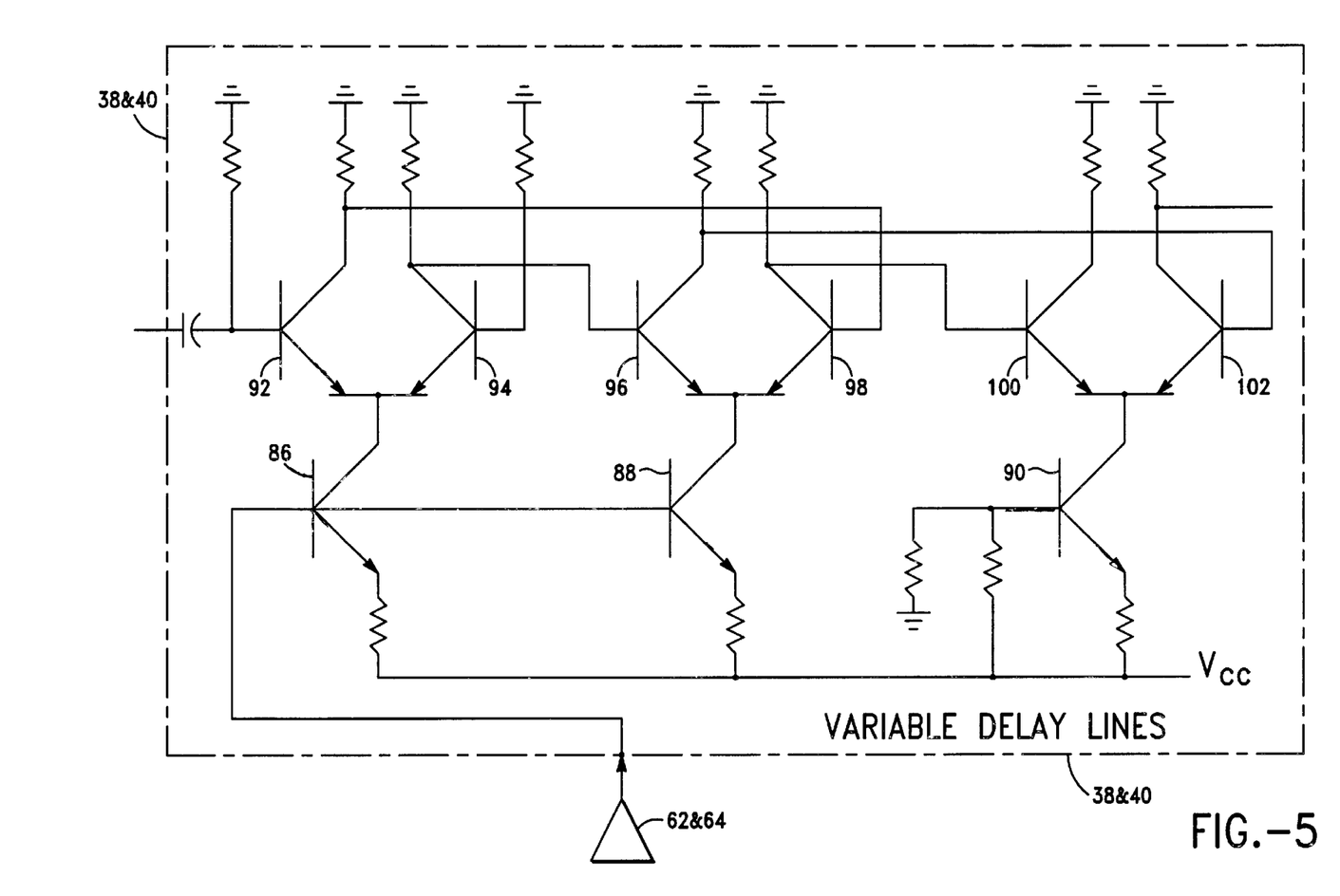
FIG. 5 illustrates details of the clock front end variable delay lines set forth in FIGS. 2 and 4, FIG. 6 sets forth the time delay characteristics of the clock front end variable delay lines set forth in FIG. 2.

In the operation of the clock front end 26, FIG. 2, a subtone clock signal applied to the input of variable delay lines 38, 40 is delayed by a time interval determined by the operation of processor 60. Each variable delay line 38 and 40, FIG. 5, is designed such that when in an idle state, digital-to-analog controllers 62, 64, 66, 68 are in an OFF state with transistor devices 86, 88, 92, 94, 96 and 98 in an OFF state. Transistor devices 90, 100 and 102, FIG. 5, are ON in the idle state thereby applying a negative signal to input C of flip/flops 44 and 50 of data converter 22. Digital-to-analog controllers 62, 64, when activated by processor 60, normally biases transistor devices 86, 88 which initially do not turn ON. Thus, transistors devices 96, 98 remain in the OFF state. With transistors devices 96, 98 OFF, transistor devices 100 and 102 remain ON and apply a negative signal to the C input of flip/flops 44 and 50. When a substone clock signal is applied to transistor device 92, transistor devices 92 and 94 turn ON at an initial point on the input curve of the received subtone clock signal transient as determined by processor 60 biasing transistor device 86 to the ON state. The ON state of transistor device 92, maintains transistor device 98 in the OFF state. With transistors devices 100 and 102 ON the negative signal is still applied to the C input of flip/flops 44 and 50 although the clock received signal has been received by variable delay lines 38 or 40. After a time transistor devices 88, 96 and 98 turn ON and operate to turn OFF transistor devices 100 and 102 thereby applying a pulse delayed in time with respect to receipt of the initial subtone clock signal to the input C of the appropriate flip/flop circuit 44 and 50.

Figure 6:
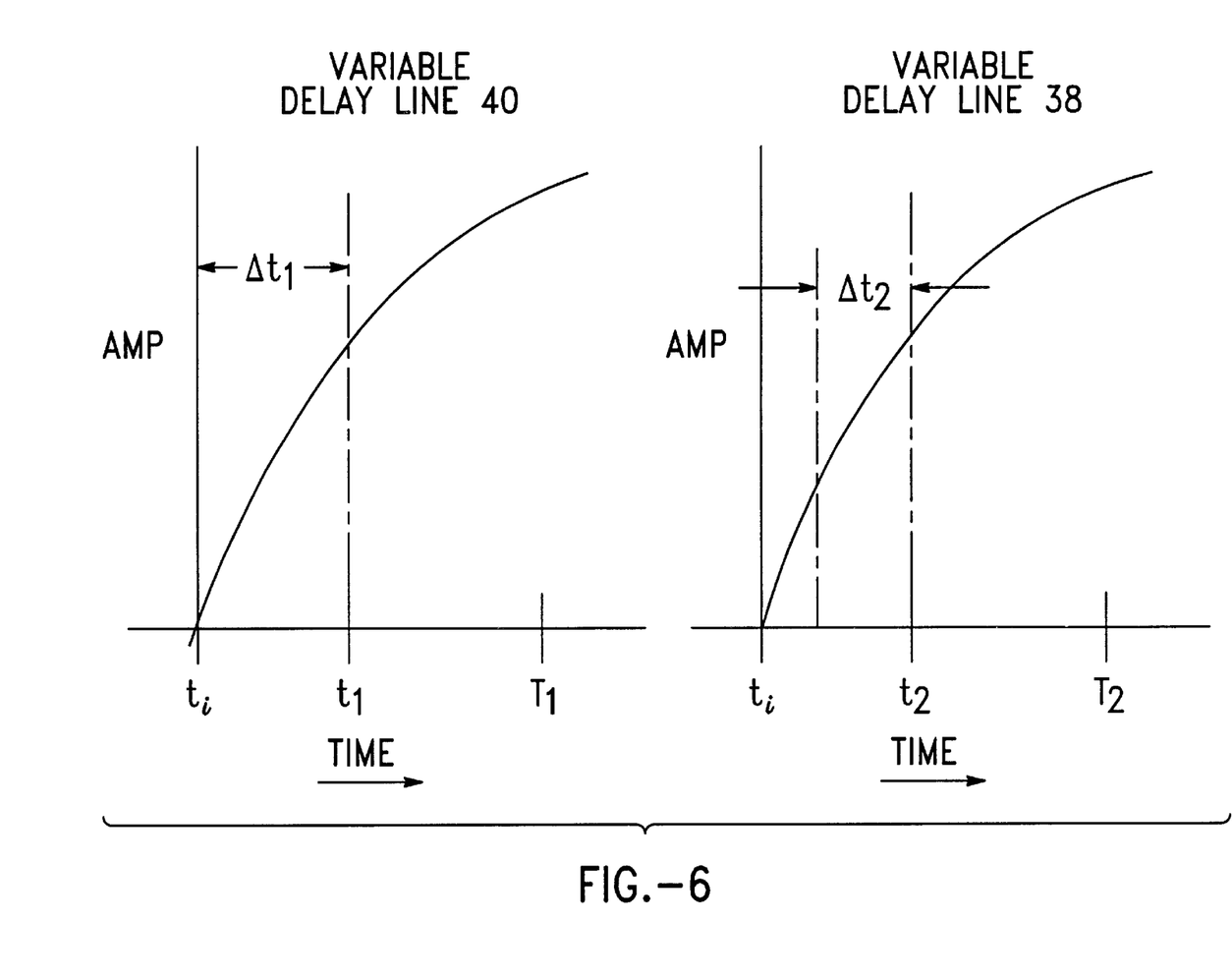

In operation, FIG. 6, the time delay of variable delay line 40 extends from a time $t_1$ in increments of $\Delta t_1$ to time T1 and depends upon the characteristics of the input wave form of the delayed subtone clock signal applied by fixed delay line 36, FIG. 2, to the input of variable delay line 40. Similarly, the time delay of 38, FIG. 6, extends from a time $t_1$ in increments of $\Delta t_2$ to time T2 and depends upon the characteristics of the input wave form of the delayed subtone clock signal applied to the input of variable delay line 38. Typically, operational characteristics of variable delay line 40 are similar to the operational characteristics set forth for variable delay line 38. Processor 60 controls the operation of digital-to-analog controllers 62, 64, by controlling the transistor devices of variable delay lines 38, 40 to determine the value of $t_1$, $\Delta t_1$, $\Delta t_2$, T1 and T2. Depending on the design characteristics of the transistor device circuitry of delay lines 38 and 40, the start time $t_1$ may be near time zero on the input waveform as shown for variable delay line 40 or may occur later on the input waveform as shown for variable delay line 38.

Figure 7:
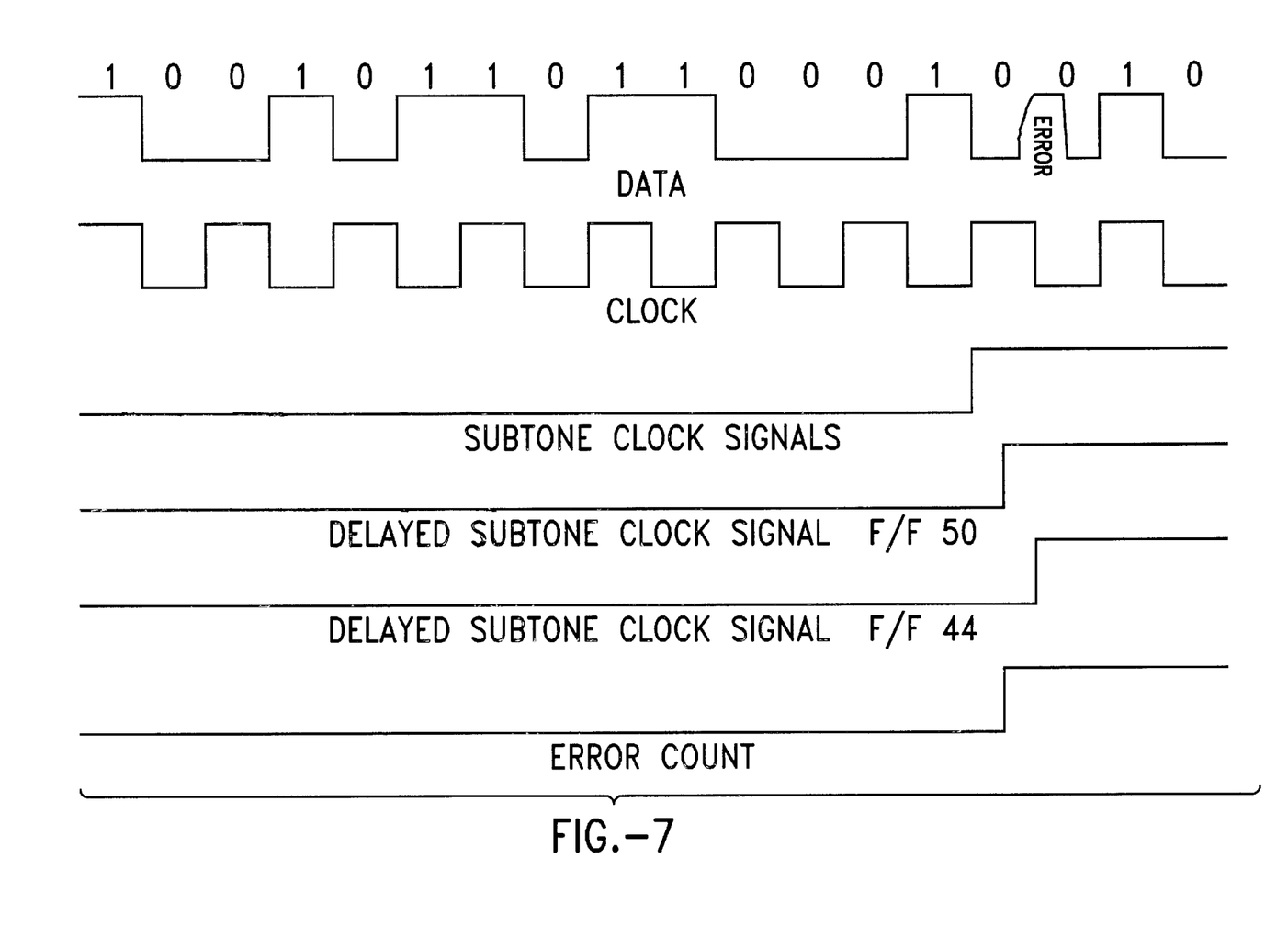
FIG. 7 illustrates wave forms of the operation of the pulse code sequence analyzer set in FIGS. 1 and 2, FIGS. 8, 9 and 10 sets forth a flow chart of the operation of the pulse code sequence analyzer.set forth in FIGS. 1 and 2.

As set forth in FIG. 7, the data transmitted between transmitter/receivers 10, 14 and received as input to voltage comparators 42, 48, FIG. 2, typically comprises digital bit information. During the transmission, noise herein represented as an error, may occur in the transmitted data. It is assumed for illustration that divide by N circuit 32 divides the recovered clock signal, FIG. 7, by 8 into a pair of subtone clock signals with one applied to the fixed delay circuit 36, FIG. 2, connected to the variable delay line 40 and the other applied to the variable delay line 38. Processor 60, in a manner hereinafter described in detail, controls variable delay lines 38 and 40 to insert variable times into the subtone clock signals to establish a variable length of time between the pair of subtone clock signals applied to the reference and auxiliary channels. The time delayed subtone clock signal applied to the C input of flip/flop 50 of the auxiliary channel occurs earlier in time than the delayed subtone clock signal applied to the C input of flip/flop 44 of the reference channel. This results in a variable length of time, or a window, occurring between the reference and auxiliary channels as shown in the time delay between the subtone clock signals applied to flip/flops 50 and 44. Errors occurring in the window, or time delay, is recorded as an error count in counter 58.

Figure 8:
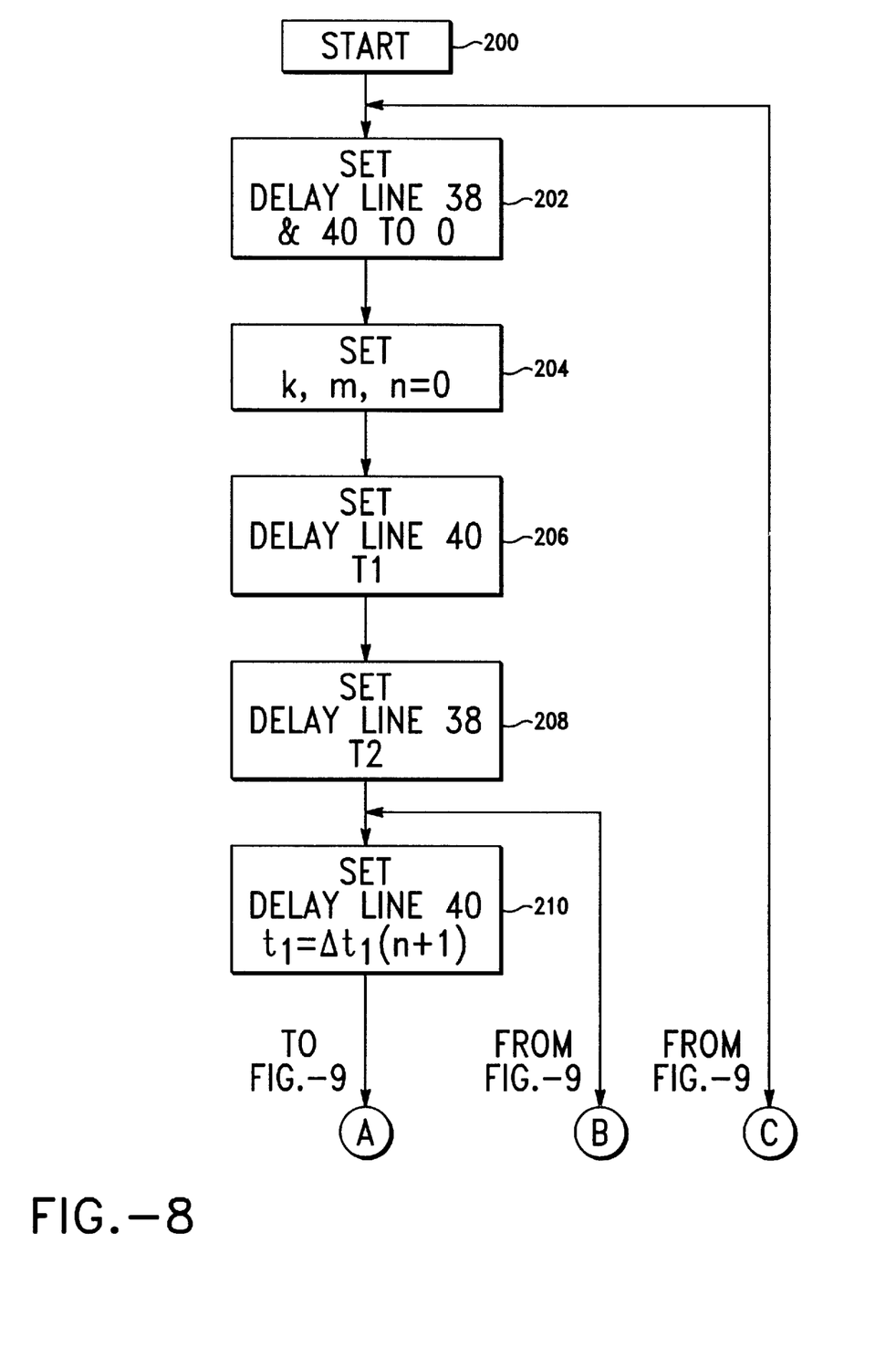
Figure 9:
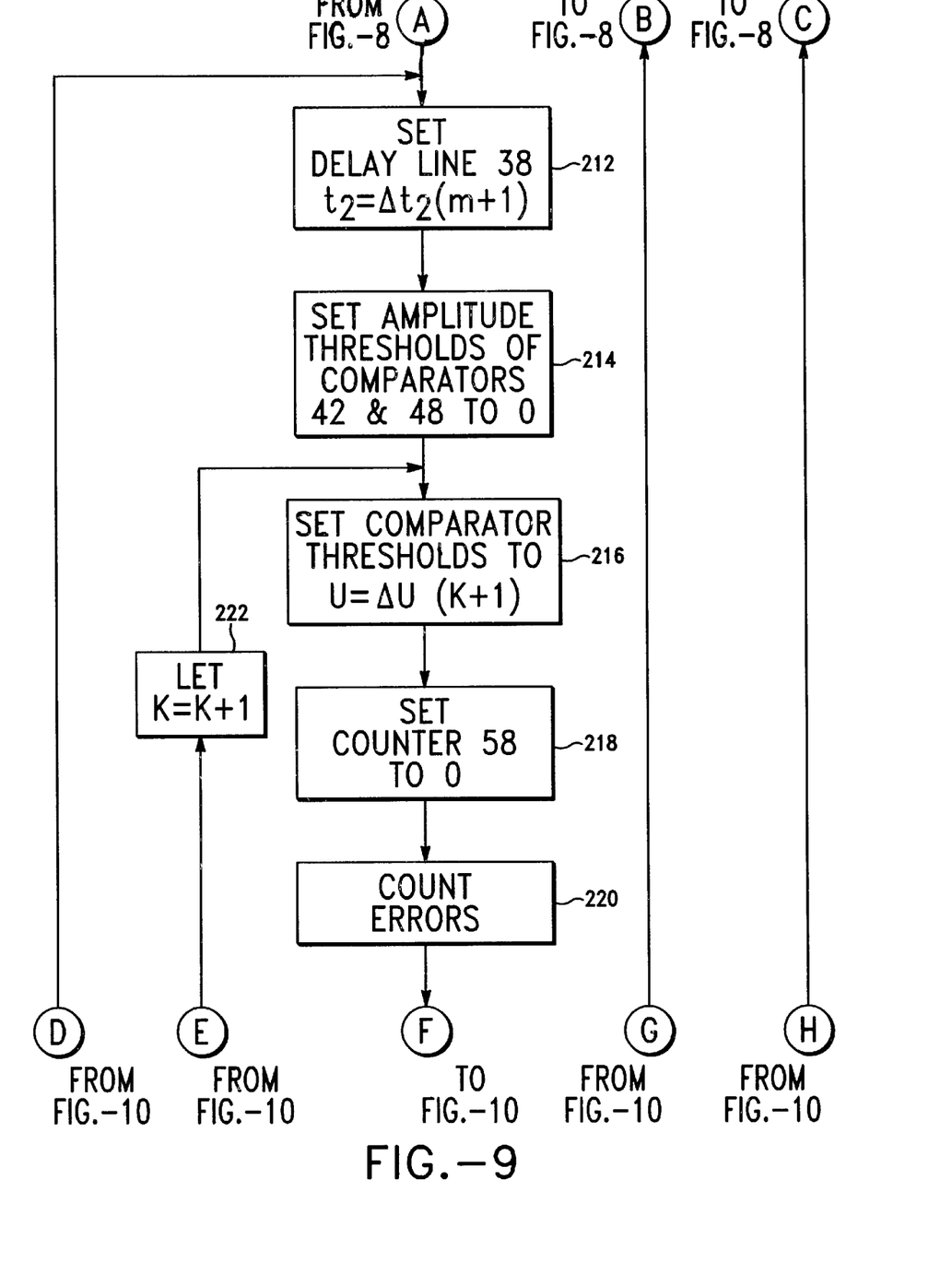
Figure 10:
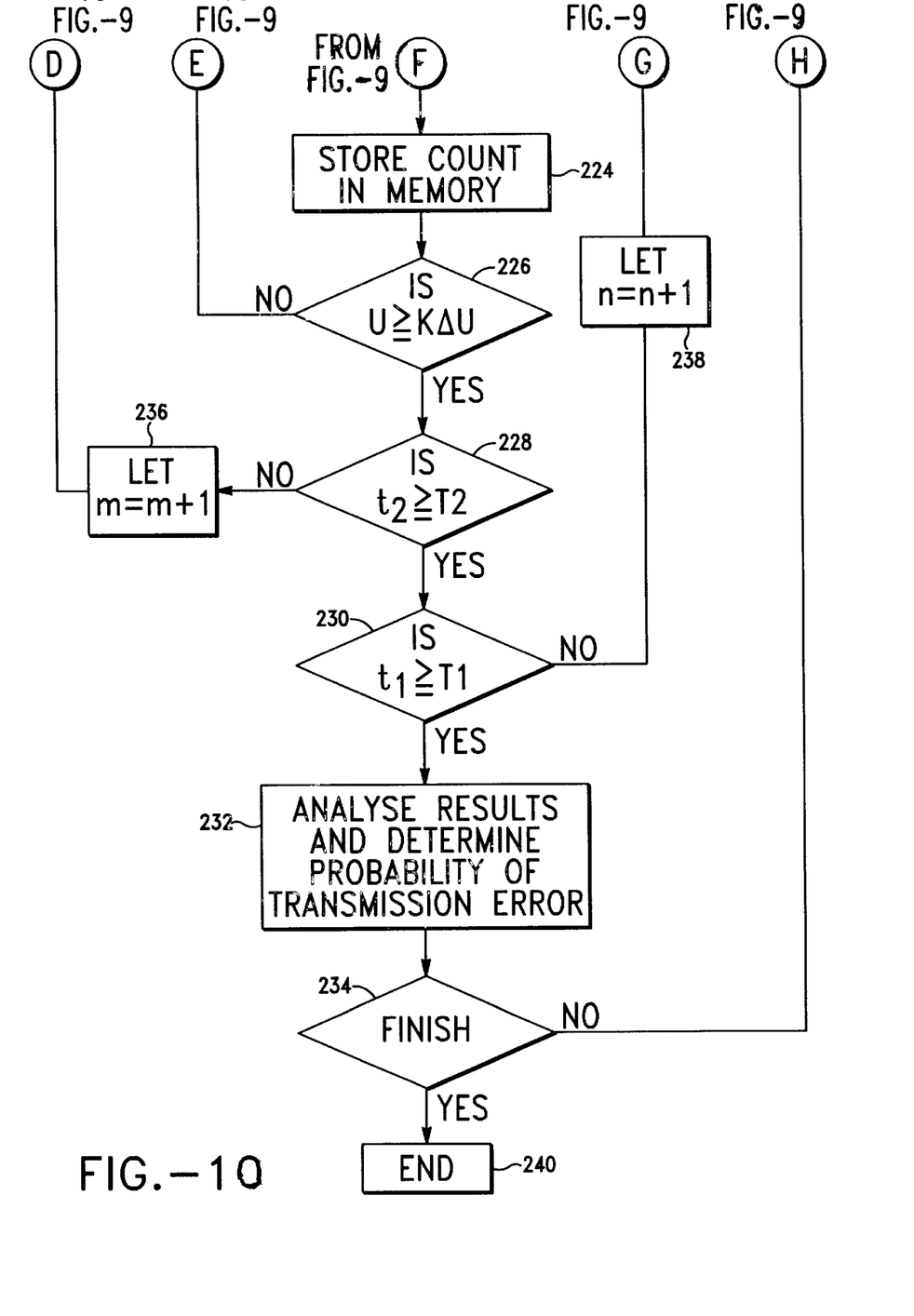

In the operation of the pulse code sequence analyzer 16, FIGS. 8, 9 and 10, the determination of errors occurring in the transmitted data starts, steps 200, 202, by setting variable delay lines 38 and 40 to zero. Processor 60 sets constants k, m and n to zero, step 204, and variable delay lines 40, 38, steps 206 and 208, to times T1 and T2, respectively. Variable delay line 40, step 210, is initially set to $t_1$ equal to $\Delta t_1(n+1)$ and variable delay line 38, step 212, is set so that $t_2$ is equal to $\Delta t_2(n+1)$ wherein n is initially zero. Typically, although not limited thereto, $\Delta t_1$ and $\Delta t_2$ may be in the range of pico seconds. Processor 60, step 214, then proceeds to set the initial voltage thresholds of the data converter 22 voltage comparators 42, 48 to zero. Comparators 42, 48, step 216, are then set to a voltage value $U=\Delta U(k+1)$ wherein U may be defined, in one example, although not limited thereto, to have a maximum value of one half volt and $\Delta U$, for example, may have increments typically in the range of one millivolt. Counter 58, initially set to zero, step 218, counts the errors appearing in the time window occurring between the reference and auxiliary channels of data converter 22, FIG. 2, and stores the count in a memory or storage medium of processor 60, FIGS. 8, 9,10, steps 220 and 224. If the voltage U at where the voltage comparators 42, 48, FIG. 2, are currently set is less than the voltage value of $k\Delta U$, step 226, the value of k, is increased by k+1, step 222 to increase the voltage threshold U of comparators, 42 and 48. Steps 216, 218, 220, 224 and 226 are then repeated until the processor 60 determines that the threshold voltage U is equal to or greater than $k\Delta U$.

Figure 11:
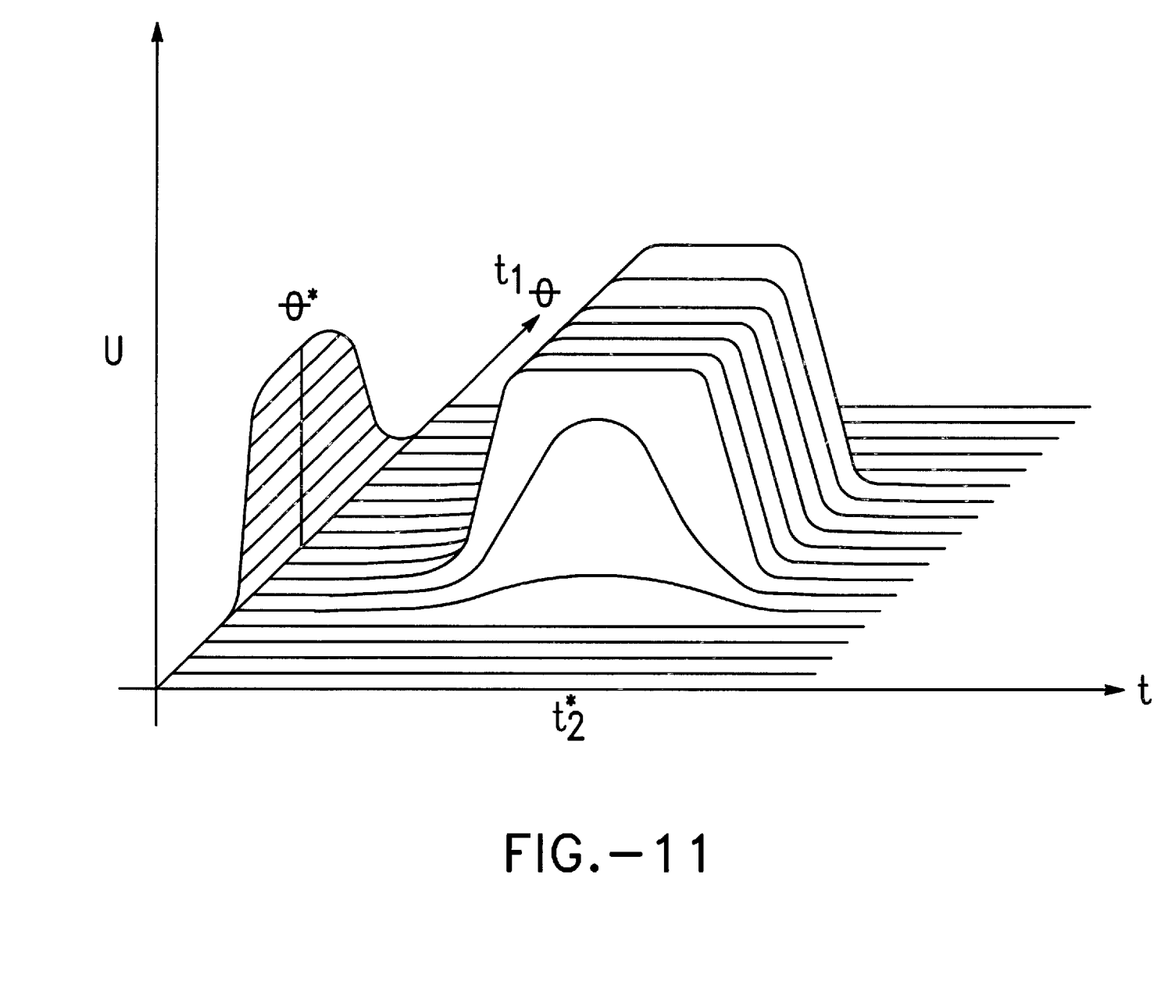
FIG. 11 illustrates a three dimensional matrix of detected transmission errors recorded by the pulse code sequence analyzer set forth in FIGS. 1 and 2.

When the voltage threshold U of voltage comparators 42, 48, FIG. 2, is equal to or greater than $k\Delta U$, processor 60 determines if delay time $t_2$ of variable delay line 38 is equal to or greater than time T2, FIG. 10, step 228. If not, the value of m is increased by m+1, step 236. Steps 212, 214, 216, 218, 220, 224, 226, 222 and 228 are repeated until processor 60 determines that the value of $t_2$ is equal to or greater than T2. When $t_2$ is equal to or greater than T2, step 230, programmable processor 60 determines if the time delay $t_1$ of variable delay line 40 is equal to or greater than time T1. If not, the processor 60, step 238, increases n by n+1 and repeats the processes set forth in the flow chart to record additional errors occurring in the data transmission. When the variable delay line 38 time $t_1$ is equal to or greater than T1, processor 60, step 232, analyzes the recorded error count and predicts errors occurring in the transmitted data. The errors are configured into a three dimensional matrix of recorded errors at a voltage level verses time, FIG. 11, thereby providing a family of probability characteristics allowing the processor 60, using statistical methods, to predict the total number of errors occurring in the data. If the process is not finished, step 234, the process is repeated until finished.

In another embodiment of the invention, a method of analyzing data of a transmission system generated and transmitted by transmitter/receivers and data transmitted between the transmitters/receivers has a step of receiving the data by a data converter in voltage comparators each associated with a data converter reference and auxiliary channel. In the event the transmission system is an optical transmission system, optical data generated by transmitter/receivers and transmitted between the transmitter/receivers is converted to a voltage format prior to being received by the data converter reference and auxiliary channels. The method also includes the steps of recovering a clock signal from the received data and dividing the recovered clock signal by a predefined number N and generating a pair of subtone clock signals therefrom. The method further includes the steps of inserting a fixed length time delay and a variable time delay in a subtone signal applied to the reference channel and another variable time delay in the other subtone clock signal applied to the auxiliary cane such that the pair of subtone clock signals are separated by a variable time delay or window. The method varies the voltage level of the channel voltage regulators to determine the voltage amplitude of the data received by the reference and auxiliary channels and the length of the variable time delays in time thereby changing the time length or window between the channels separated by a variable time length. Errors appearing in the data received by the data converter reference and auxiliary channels during the variable time delay between the channels are detected and counted and recorded in a memory of a processor as a three dimensional matrix of the counted errors in a voltage amplitude versus time format enabling the processor to determine a probability predicting the data errors occurring in the transmission system. The method of analyzing the transmission data further includes the step of generating analog signals in response to digital signals received from the processor for controlling the voltage level oft he channel voltage comparators and the time delay of the variable time delays in real time.

It is obvious from the foregoing that the facility, economy and efficiently of pulse code sequence analyzer systems is improved by apparatus having processor controlled clock and data converter apparatus for detecting errors occurring in data transmission between transmitter/receiver and in the transmitter/receivers and wherein the processor counts ones of the data transmission errors and predicts the errors occurring in the transmitted data.

While the foregoing detailed description has described an embodiment of a pulse code sequence analyzer system and a method of operation thereof in accordance with principles of the invention, it is to be understood that the above description is illustrative only and is not limiting of the disclosed invention. Particularly other configurations of time delay, voltage comparator, digital-to-analog and control apparatus are within the scope and sprit of this invention. Thus, the invention is to be limited only by the claims set forth below.

What is claimed is:

1. A pulse code analyzer for analyzing data, comprising:

data converter means having a reference and an auxiliary channel each for receiving the data, clock means for recovering a clock signal from the data and for dividing the recovered clock signal by a predetermined number N to generate subtone clock signals and applying the generated subtone clock signals to the data converter means, counter means coupled with the data converter means and clock means and enabled by delayed ones of the subtone clock signals for recording errors occurring in the data, and processor means coupled to the counter, data converter and clock means for controlling the clock to delay the subtone clock signals and the data converter means to detect errors occurring in the data received by the data converter means and for recording a three dimensional matrix of the recorded errors determining a probability predicting the data errors.

2. A pulse code analyzer for analyzing data comprising data converter means having a reference and an auxiliary channel for each receiving the data, clock means for recovering a clock signal from the data and applying generated clock signals to the data converter means, counter means coupled with the data converter means and clock means for recording errors occurring in the data, and processor means coupled to the counter, data converter and clock means for controlling the clock and data converter means to detect errors occurring in the data received by the data converter means and for recording a matrix of the recorded errors determining a probability predicting the data errors.

3. A pulse code analyzer for analyzing data comprising data converter means having a reference and an auxiliary channel for each receiving the data, clock means for recovering a clock signal from the data and applying generated variable time delayed subtone clock signals to the data converter reference and auxiliary channels, counter means coupled with the data converter reference and auxiliary channels for recording errors occurring in the data, and processor means coupled to the counter, data converter and clock means for controlling a time delay between the subtone clock signals and a voltage level of the received channel data to detect errors occurring in the data received by the data converter means and for recording a three dimensional matrix of the recorded errors determining a probability predicting the data errors.

4. A pulse code analyzer for analyzing incoming serial data comprising:

data converter means having a reference and an auxiliary channel for each receiving the incoming serial data;

clock means for recovering a clock signal from the incoming serial data and applying generated clock signals to the reference and auxiliary channels of the data converter means;

counter means coupled with the data converter means and clock means for recording accumulated errors occurring in the data; and processor means coupled to the counter, data converter and clock means for controlling the clock and data converter means to detect errors occurring in the data received by the data converter means and for recording a matrix of the recorded accumulated errors and determining a probability predicting the data errors.

* * * * *